(12) United States Patent
Grimsrud

(10) Patent No.: US 7,424,665 B2
(45) Date of Patent: Sep. 9, 2008

(54) DEVICE AND METHOD FOR SELECTING OPCODE VALUES WITH MAXIMUM HAMMING DISTANCE TO MINIMIZE LATENCY AND BUFFERING REQUIREMENTS

(75) Inventor: Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 11/236,672

(22) Filed: Sep. 28, 2005

(65) Prior Publication Data

US 2006/0022850 A1   Feb. 2, 2006

Related U.S. Application Data

(62) Division of application No. 09/819,707, filed on Mar. 29, 2001, now Pat. No. 6,986,094.

(51) Int. Cl.
*H03M 13/00* (2006.01)

(52) U.S. Cl. .................................. 714/777; 714/758

(58) Field of Classification Search ............... 714/777, 714/758
See application file for complete search history.

(56) References Cited

U.S. PATENT DOCUMENTS

| | | | | |
|---|---|---|---|---|
| 5,241,546 A * | 8/1993 | Peterson et al. | ............ | 714/761 |
| 5,448,592 A * | 9/1995 | Williams et al. | ............ | 375/261 |
| 5,875,439 A * | 2/1999 | Engel et al. | ................. | 706/41 |
| 5,881,071 A * | 3/1999 | Kuznetsov et al. | ......... | 714/752 |
| 6,772,385 B2 * | 8/2004 | Ohyama et al. | ............ | 714/755 |
| 2001/0053225 A1 * | 12/2001 | Ohira et al. | ................ | 380/239 |

* cited by examiner

*Primary Examiner*—M. Mujtaba K Chaudry
(74) *Attorney, Agent, or Firm*—Kenyon & Kenyon LLP

(57) ABSTRACT

A method, device, and computer program to generate operation codes having a maximum hamming distance between them. Utilizing these operation codes it is possible to detect errors immediately upon receipt of a first byte of data in a packet to allow the receiver to immediately act on the received data. This reduces the need for buffer space on both the transmitting and receiving devices. Further, this method reduces the latency for the receiver acting on the incoming data.

5 Claims, 7 Drawing Sheets

DEVICE AND METHOD FOR SELECTING OPCODE VALUES WITH MAXIMUM HAMMING DISTANCE TO MINIMIZE LATENCY AND BUFFERING REQUIREMENTS

This is a division of application Ser. No. 09/819,707 filed 29 Mar. 2001 now U.S. Pat. No. 6,986,094, the content of which is incorporated herein by reference.

FIELD

The invention relates to a device and method for maximizing hamming distance of encoded opcodes and detecting communication errors to minimize latency and buffer storage requirements. In particular, a device, method and computer program is disclosed that is able to generate encoded opcodes that allow for error detection over high speed serial communications lines immediately upon receipt by maximizing the hamming distance between the encoded opcodes and minimizing the need for buffer space by allowing early decode of the opcode prior to post reception error detection of an entire packet of data.

BACKGROUND

Microprocessor performance has seen incredible increases over the short history of computers. With this increase in processor performance, seen in the increased number of processor cycles per second, has come the heed for a comparable increase in access speed to data and instructions. Otherwise, it provides little benefit to have a very fast processor if it is spending most of its time waiting for retrieval of data and instructions from storage devices such as disk and tape drives. In order to achieve fast transfer rates between a peripheral and a processor it was common to use a parallel communications interface in order to maximize the data transfer rate. In such a parallel communications interface it was typical to transmit a full word (usually 32 bits) at the same time using at least one wire per bit. However, more recently, serial communications has so significantly increased in speed that up to 1.5 gigabits per second of data may be transferred over a Serial ATA communications link.

FIG. 1 is an example of such a Serial ATA communications link 30 connecting a peripheral device 40 to a processor 10 located on a baseboard 20. Utilizing such a communications link 30 the number of wires required to connect a peripheral device, such as a disk drive, CD-ROM, DVD or other peripheral device is substantially reduced. Data may be transferred over such a Serial ATA communications link 30 in the form of bits, bytes, or more typically packets. Packets of data may contain as much as 8,192 bytes of information, but any size packet is possible.

However, in such a Serial ATA communications link, buffer space is required both in the baseboard 20 and the peripheral device 40 in order to store one or more packets of information being transferred. This buffer space is required due to the CRC (cyclical redundancy checking) error checking technique being used in the Serial ATA communications protocol. CRC is an error checking technique used to determine the integrity of received data. However, the CRC error check is complete only after the entire packet is received. Therefore, it is necessary to store the received data temporarily in a buffer while performing the CRC error checking, and then determine whether the packet was correctly received. In the case where an error is detected, retransmission is requested for the entire packet by the receiving device. Therefore, valuable space is required on the baseboard 20 and in the peripheral device 40 to store these packets of data until they are checked using the CRC error checking technique. Further, in the case where there is an error, valuable time is wasted in order to transmit the retransmit request and receive the entire packet at least twice in order correct the error.

Therefore, what is needed is a device, method, and computer program that allows the received Opcode of an incoming packet to be decoded and verified as correct immediately upon receipt. This device, method, and computer program minimizes the need for buffer space in the receiving unit by allowing the Opcode to be decoded and acted upon before the CRC check for the complete packet is done.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
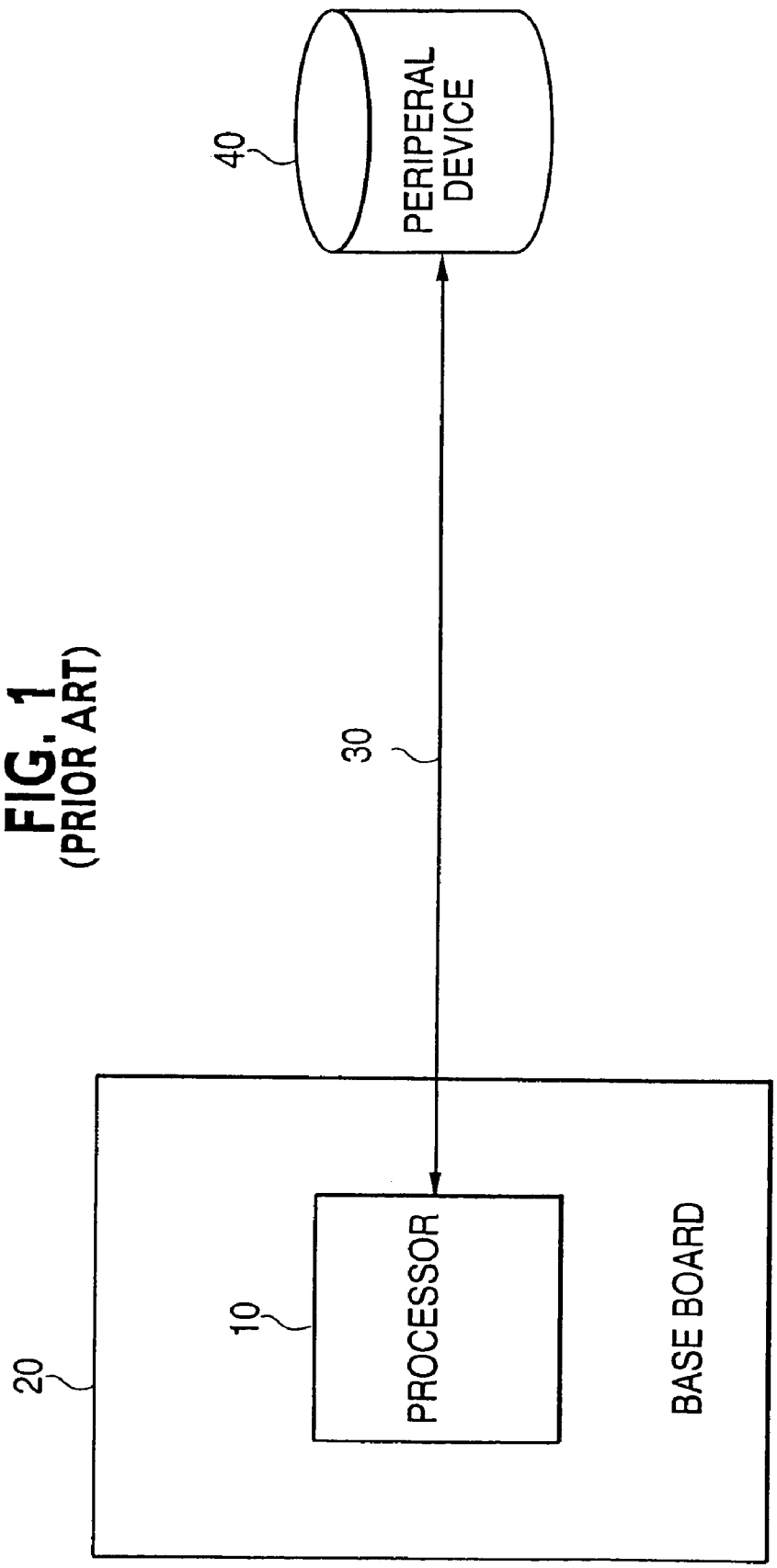
FIG. 1 is an example of the prior art using a serial communications link to connect a processor to a peripheral device.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known power connections to integrated circuits and other components may not be shown within the FIGs. for simplicity of illustration and discussion, and so as not to obscure the invention.

Figure 2:
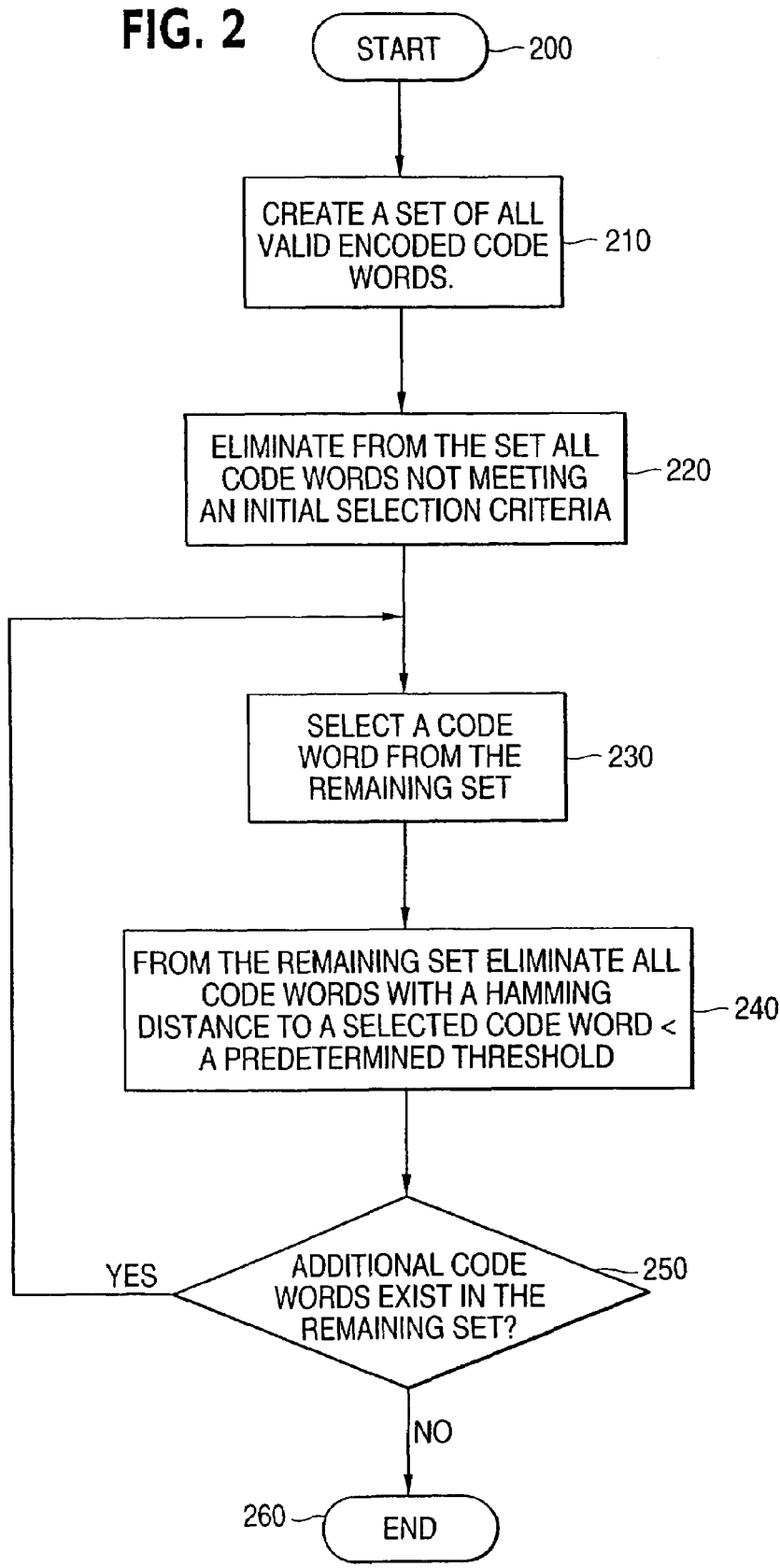
FIG. 2 is a flowchart of an Opcode (operation code) generation process utilized to generate Opcode of given minimum hamming distance in an example embodiment of the present invention.

FIG. 2 is a flowchart of an Opcode (operation code) generation process utilized to generate Opcodes of given minimum hamming distance in an example embodiment of the present invention. The Opcode generation process begins execution in operation 200 and immediately proceeds operation 210. In operation 210, the Opcode generation process creates a set of all valid encoded code words. These valid encoded code words may be, but not limited to, encoded code words of a particular length. For example, if an eight bit encoded code word is desired, then 256 possible code words may be generated. In the case where a 10 bit encoded code word is desired then 1,024 possible code words may be generated. An example of 10 bit encoded code words may be found in the left most column of table 1 illustrated and discussed in further detail ahead. Processing then proceeds to operation 220 where from the set of code words generated in operation 210 certain opcodes are eliminated which do not meet specified initial criteria. These criteria may be, but not limited to, specifying that each code words haven equal number of bits set to zero and bits set to one. In this manner it is possible to determine immediately if an error has occurred if an encoded code word does not have an equal number of ones and zeros. Other selection criteria are possible such as limiting the range of the permissible values.

Still referring to FIG. 2, in operation 230 a code word of the remaining code words in the set generated by operation 220 is selected. This selection may be as simple as selecting the first code word in the list and proceeding sequentially thereon. Thereafter, in operation 240 the remainder of the code words generated in operation 220 are examined and all code words which have a hamming distance less than a predetermined value to the selected code word are eliminated from the list. For example, if a hamming distance of 4 is selected then no two encoded code words may have less than four bits different from each other. In operation 250, it is determined if additional encoded code words exist in the set generated in operation 220. If additional code words exist then processing proceeds back to operation 230 where the next code word in the list is selected. However, if no further code words exist in the list generated in operation 220, then processing proceeds to operation 260 where processing terminates. Upon termination of the Opcode generation process, a list of encoded code words is generated as shown in the left most column of table 1 listed ahead.

TABLE 1

| 10b Encoding (binary) | 8b Decoded bu Scrambled Value (hex) | Scrambler Syndrome (hex) | Opcode Value (hex) |
| --- | --- | --- | --- |
| 0101011010 | 0xAA | 0x8D | 0x27 |
| 1001101010 | 0xB9 | 0x8D | 0x34 |
| 0010111010 | 0xB4 | 0x8D | 0x39 |
| 0011010110 | 0xCC | 0x8D | 0x41 |
| 1101000110 | 0xCB | 0x8D | 0x46 |
| 1010100110 | 0xD5 | 0x8D | 0x58 |
| 0100110110 | 0xD2 | 0x8D | 0x5F |
| 0011011001 | 0x2C | 0x8D | 0xA1 |
| 1101001001 | 0x2B | 0x8D | 0xA6 |
| 1010101001 | 0x35 | 0x8D | 0xB8 |
| 0100111001 | 0x32 | 0x8D | 0xBF |
| 0101010101 | 0x4A | 0x8D | 0xC7 |
| 1001100101 | 0x59 | 0x8D | 0xD4 |
| 0010110101 | 0x54 | 0x8D | 0xD9 |

FIGS. 3 through 6 are flowcharts representing software, commands, firmware, hardware, instructions, computer programs, subroutines, code and code segments. The elements and operations of FIGS. 3 through 6 may take any form of logic executable by a processor, including, but not limited to, programming languages, such as C++.

Figure 3:
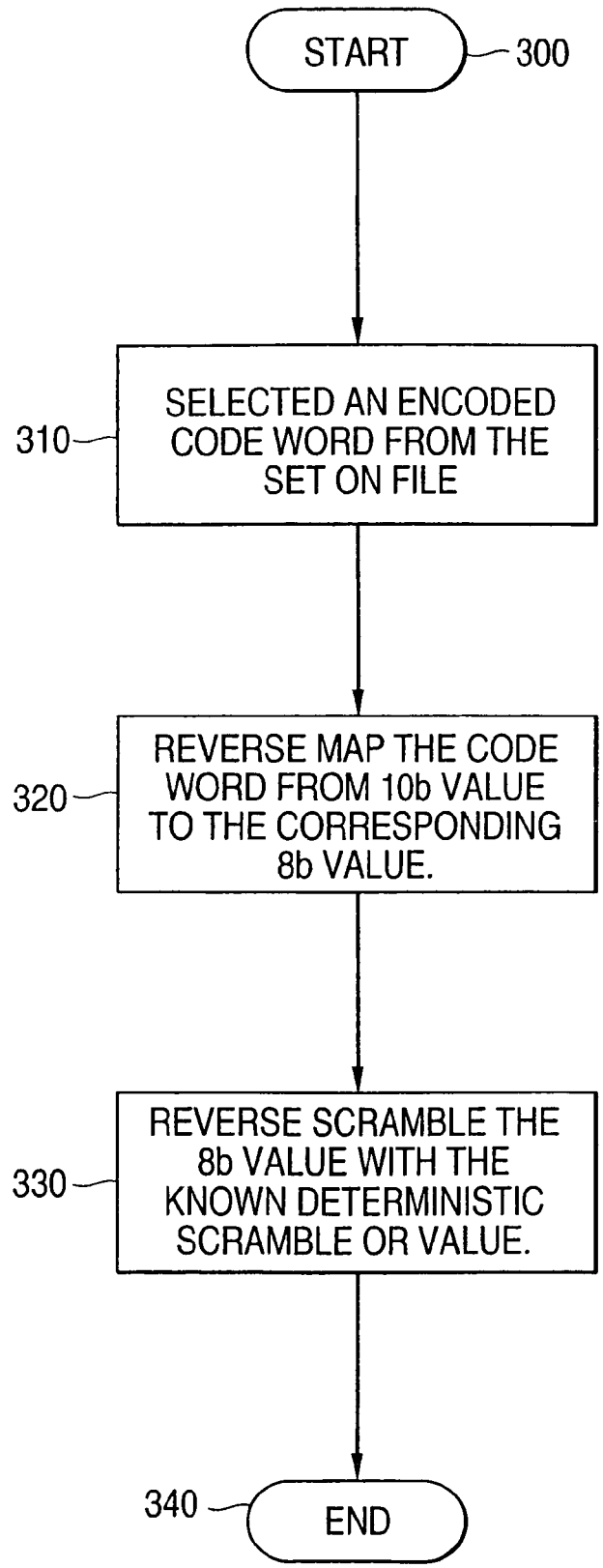
FIG. 3 is a flowchart of an Opcode encode module to generate original code words utilized in an example embodiment of the present invention.

FIG. 3 is a flowchart of an Opcode encode module to generate original code words utilized in an example embodiment of the present invention. This Opcode encode module takes encoded code words generated by the Opcode generation process, shown in FIG. 2, and by a process of unscrambling and unencoding the encoded code word generates an operations code that may later be utilized by processor 10 or peripheral device 40. The Opcode encode module begins execution in operation 300 and immediately proceeds to operation 310. In operation 310, an encoded Opcode, as shown in the left most column of table 1, is selected from the file set. Thereafter, in operation 320 the encoded code word is reverse mapped to its corresponding unencoded scrambled value having fewer bits. In the example illustrated in table 1, the unencoded value contains eight bits. The scrambler values are generated using the equivalent of a linear feedback shift register (LFSR) scrambler generator 620, shown in FIG. 6 and FIG. 7, and is reset at the beginning of a packet yielding an initial output value listed in table 1. The LFSR operates based on a polynomial where $G(x)=X^{16}+X^{15}+X^{13}+X^{4}+1$. However, as would be appreciated by one of ordinary skill in the art, numerous different polynomials may be utilized by the LFSR. Once the unencoded scrambled value is generated in operation 320 processing proceeds to operation 330. In operation 330, the unencoded scrambled value is reverse scrambled using the scrambler syndrome or seed to generate opcode that is unencoded and unscrambled as shown in table 1. Since the reversed scramble operation is deterministic in nature the same opcode will be generated for a given scrambled value if the scrambler syndrome or seed remains constant or is known and the scrambler is reset at a known point (for example at the beginning of reception of a packet). Thereafter, processing proceeds operation 340 where processing terminates.

Figure 4:
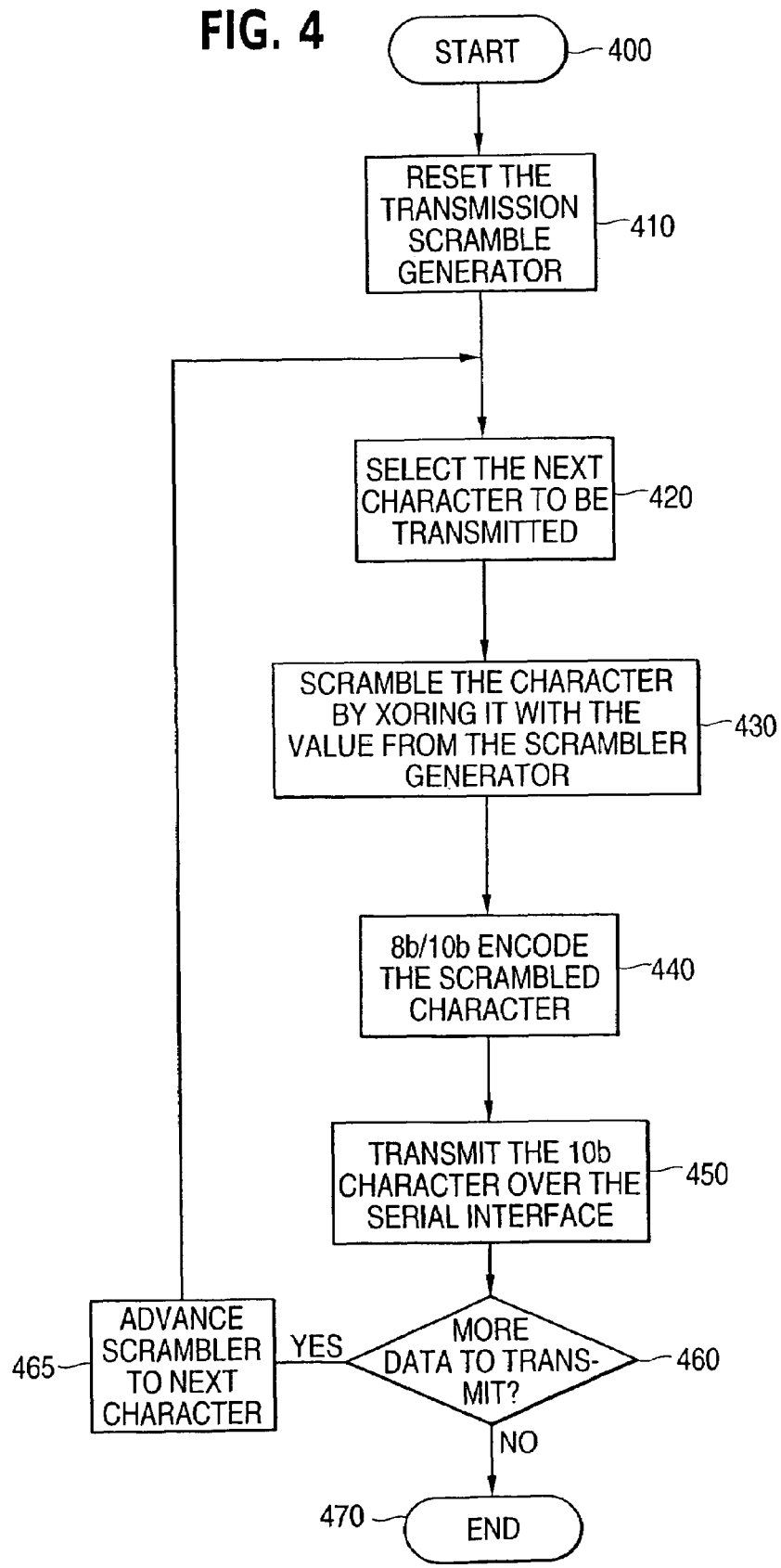
FIG. 4 is a flowchart of a transmission module to transmit data having an Opcode generated by the Opcode generation process as a first byte in an example embodiment of the present invention.
Figure 6:
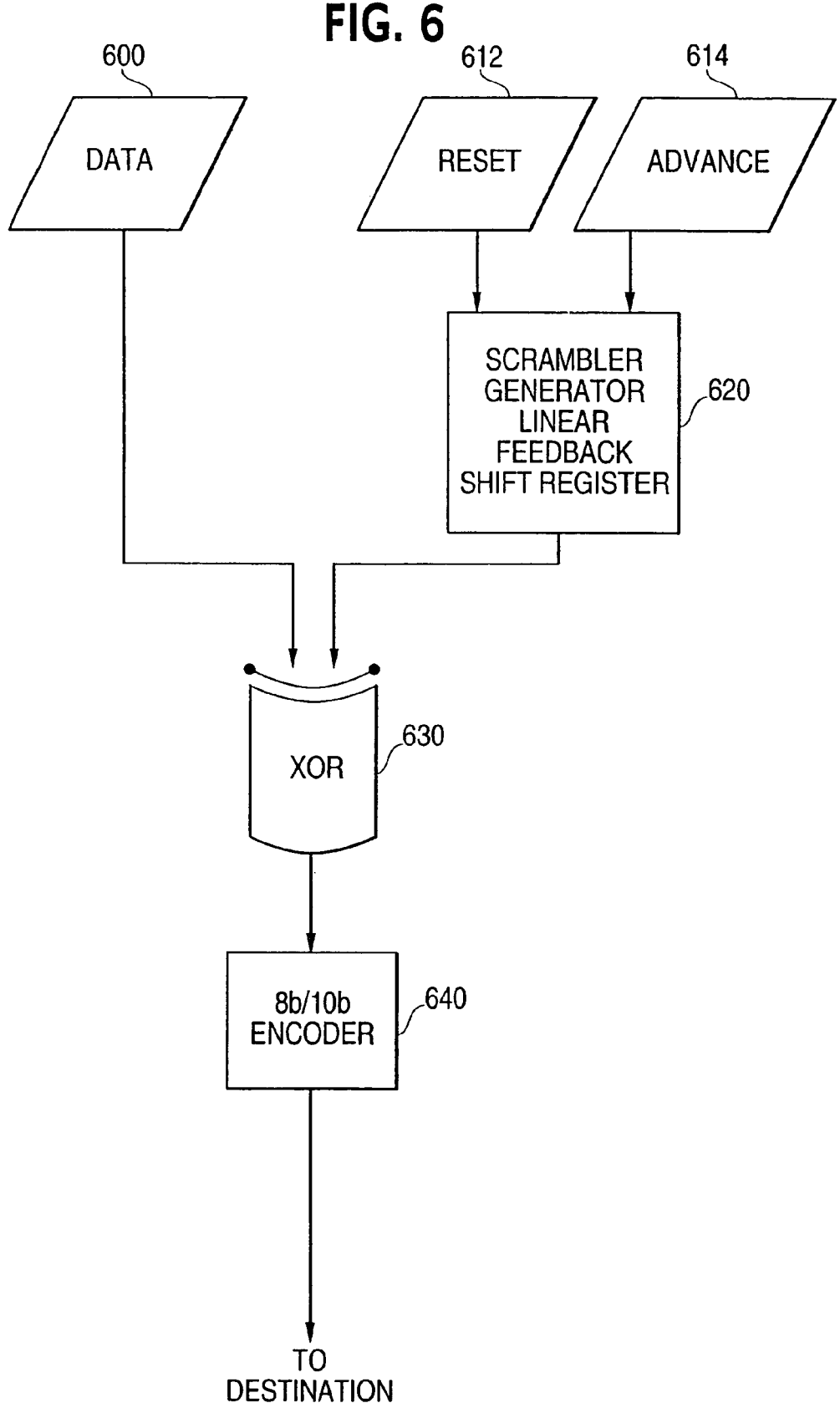
FIG. 6 is a hardware block diagram illustrating the encoding and transmission of data in an example embodiment of the present invention.

FIG. 4 is a flowchart of a transmission module to transmit data having an Opcode generated by the Opcode generation process, shown in FIG. 2, as a first byte in an example embodiment of the present invention. The transmission module begins execution in operation 400 and immediately proceeds with operation 410. In operation 410, the scrambler 620, shown in FIG. 6, is reset. Thereafter, in operation 420 a character is selected for transmission. The first character transmitted may be the Opcode and thereafter the remainder of the packet is transmitted. However, as would be appreciated by one skilled in the art, the Opcode may be in any portion of the packet as long as it is at a fixed location. Processing then proceeds to operation 430 where the character or Opcode is XORed (an exclusive or operation) with the value created by the scrambler generator 620. In operation 440 the resulting value, from operation 430, is encoded from an eight bit value to a 10 bit value as illustrated in table 1. Thereafter, in operation 450, the encoded 10 bit character is transmitted over serial communications link 30, shown in FIG. 1. Thereafter, it is determined, in operation 460, whether any additional data needs to be processed. If additional data needs be transmitted then the scrambler 620 is advanced in operation 465 and processing loops back to operation 420. However, if no further data needs to be transmitted then processing proceeds to operation 470 where processing terminates.

Figure 5:
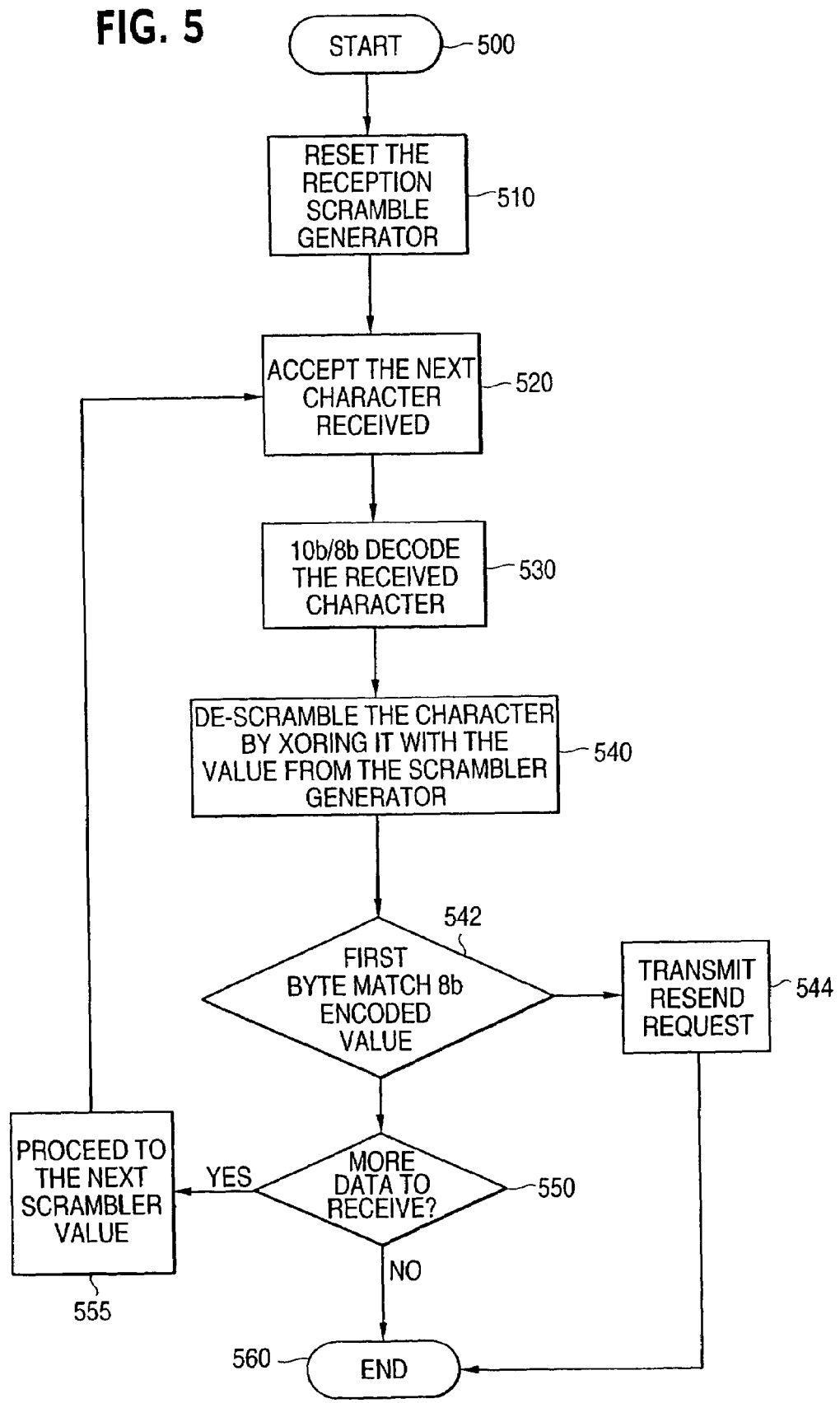
FIG. 5 is a flowchart of a reception module to receive data having an Opcode generated by the Opcode generation process as a first byte in an example embodiment of the present invention.

FIG. 5 is a flowchart of a reception module to receive data having an Opcode generated by the Opcode generation process, discussed in reference to FIG. 2, as a first byte in an example embodiment of the present invention. The reception module begins execution in operation 500 and immediately proceeds to operation 510. In operation 510, the scrambler generator 620 is reset utilizing the seed (scrambler syndrome) discussed in reference to FIG. 3 and table 1. In this manner the scrambler generator 620, discussed in reference to FIGS. 6 and 7, may later be able to de-scramble data received. In operation 520 the next character is received. Processing then proceeds to operation 530 where the data received is decoded from a 10 bit character to an eight bit character as illustrated in table 1. In operation 540 the scrambler generator 620 de-scrambles the character or data by XORing it with the seed or scrambler syndrome previously discussed. In operation 542, it is determined whether this first byte received matches the 8 bit encoded value listed in example table 1. If no match is discovered then processing proceeds to operation 544 where the received packet is rejected due to error. Thereafter, processing proceeds from operation 544 to operation 560 where processing terminates. However, if the 8 bit encoded value received matches the 8 bit encoded value contained in example table 1, then processing proceeds to operation 550. In operation 550 it is determined if any more data is to be received. If additional data is to be received, then in operation 555 the scrambler is advanced to its next value and processing loops back to operation 520. Otherwise, processing proceeds to operation 560 where processing terminates.

FIG. 6 is a hardware block diagram illustrating the encoding and transmission of data in an example embodiment of the present invention. The hardware shown in FIG. 6 comprises a transmission unit. The hardware (transmission unit) shown in FIG. 6 resides within baseboard 20, shown in FIG. 1. However, as would be appreciated by one ordinary skill in the art, the equivalent hardware (transmission unit) would also reside within peripheral device 40. FIG. 6 illustrates data being input to the hardware and if it is the first byte of data, it resets the scrambler generator 620 to its initial state via reset 612. This first byte of data being transmitted contains the Opcode indicating the type of operation associated with the packet. The scrambler generator 620 would generate a sequence of scrambling values starting with the initial value illustrated in table 1. The scrambled values are generated by XORing the scrambler value with the data to transmit in unit 630. Using a seed the scrambler generator 620 would generate an eight bit scrambled value as illustrated in table 1 using the XOR unit 630. After processing through the XOR unit 630 an eight bit scrambled value, as shown in table 1, would be generated. Thereafter, an 8b/10b encoder 640 would take the eight bit scrambled value would encode it into a 10 bit encoded value and transmit it to a destination. It should be noted that all data being transmitted including the first character sent is XORed in XOR unit 630 with the scrambler output from unit 620. Further, an advance line 614 would advance the scrambler generator 620 to the next character.

Figure 7:
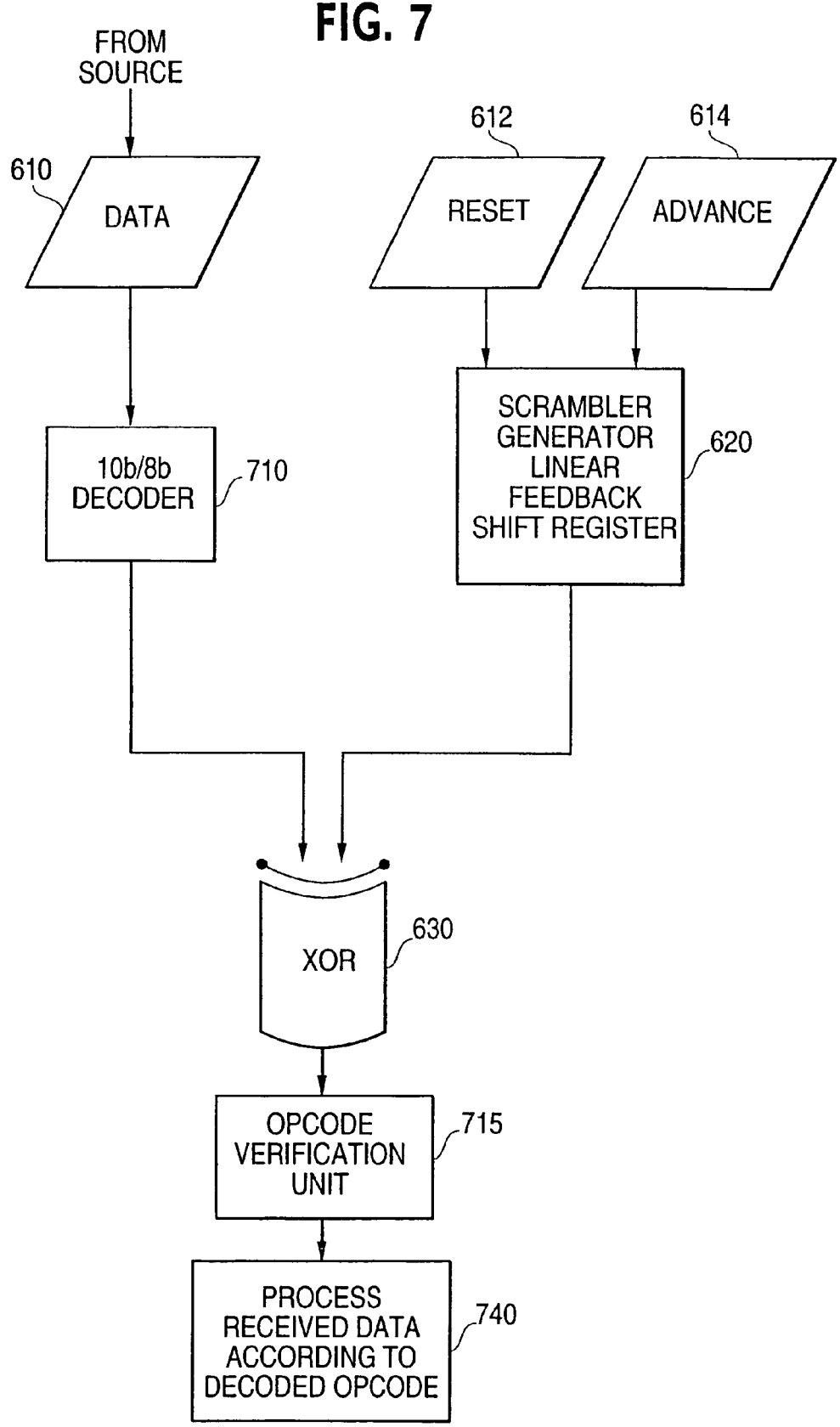
FIG. 7 is a hardware block diagram illustrating the decoding upon reception of data in an example embodiment of the present invention.

FIG. 7 is a hardware block diagram illustrating the decoding upon reception of data in an example embodiment of the present invention. The hardware illustrated in FIG. 7 represents a reception unit. Data 610 is received from a source and sent to a 10b/8b decoder which converts the data from a 10 bit value to an 8 bit value. At the same time a reset line 612 is sent to the scrambler generator 620 to reset it using a seed value. The output from the scrambler generator 620 and the 10b/8b decoder 710 are XORed by exclusive or (XOR) unit 630. The output from the XOR unit 630 is an opcode which is checked against the example values shown in table 1 by the opcode verification unit 715. Thereafter, if a match is found for the opcode, then the associated process 740 is performed for the opcode. Further, an advance line 614 is provided to advance the scrambler generator 620 to the next character.

Still referring to FIG. 7, as would be appreciated by one skilled in the art, the hardware depicted in FIG. 7 (the reception unit) would also reside in baseboard 20 in order to accomplish two-way to communications.

Using the embodiments of the present invention discussed above, it is possible to generate operation codes that have a maximum hamming distance between them. Since it is assumed that if a correct operation code is not received then a transmission error has occurred, this maximum hamming distance makes possible the early detection of transmission errors in the opcode field, allowing proper processing of the rest of the incoming packet without awaiting final CRC check. Further, due to the hamming distance between operation codes and the expansion of operation codes to include ten or more bits, the probability that a transmission error would result in another valid operation code is very remote. Upon detection of an incorrect operation code the receiving device can immediately request a retransmission before the entire packet is received. Further, using the embodiments of the present invention it is possible to minimize the use of buffer space in a base board and peripheral device since the opcode field can be acted upon with confidence at the beginning of reception of a packet.

While we have shown and described only a few example embodiments herein, it is understood that numerous changes and modifications as known to those skilled in the art could be made to the present invention. Therefore, we do not wish to be limited to the details shown and described herein, but intend to cover all such changes and modifications as are encompassed by the scope of the appended claims.

I claim:

1. A method of generating operation codes, comprising:
   creating a plurality of encoded code words;
   eliminating from the plurality of encoded code words all code words that do not meet a predetermined selection criteria;
   selecting an encoded code word from the plurality of remaining encoded code words;
   determining a hamming distance between the selected encoded code word and all remaining encoded code words;
   deleting all of the remaining encoded code words that do not have a hamming distance greater than a predetermined minimum with the selected encoded code word, to form a set of encoded code words, wherein the predetermined minimum hamming distance prevents any two encoded code words from having fewer than a predetermined number of bits different.

2. The method recited in claim 1, wherein the predetermined selection criteria is that each encoded code word will have an equal number of ones and zeros.

3. The method recited in claim 2, wherein the operations of selecting an encoded code word from the plurality of remaining encoded code words, determining a hamming distance between the selected encoded code word and all remaining encoded code words, and deleting all of the remaining encoding code words that do not have a predetermined minimum hamming distance with the selected encoded code word to form a set of encoded code words are repeated for each and every encoded code word in the set of encoded code words to form a finite set of encoded code words representing operation codes.

4. The method recited in claim 3, further comprising:
   selecting an encoded code word from the finite set of encoded code words; and
   reverse mapping each encoded code word of the finite set of encoded code words to form a second set of finite encoded code words in which each encoded code word has been reduced in size by a predetermined number of bits.

5. The method recited in claim 4, further comprising:
   reverse scrambling the second set finite encoded code words to form a set of operation codes, wherein the set of operation codes represent functions to be performed by a receiving device.

* * * * *